United States Patent [19]

Takenaka

[11] Patent Number: 5,123,600
[45] Date of Patent: Jun. 23, 1992

[54] WET REFUSE DISPOSER APPARATUS

[75] Inventor: Shintaro Takenaka, Fukuyama, Japan

[73] Assignees: Shinyo Industry Co., Ltd.; Mitsui Home Co., Ltd., Japan

[21] Appl. No.: 687,479

[22] Filed: Apr. 19, 1991

[30] Foreign Application Priority Data

Apr. 20, 1990 [JP] Japan .................................. 2-104622

[51] Int. Cl.[5] ............................................. B02C 18/42
[52] U.S. Cl. ........................... 241/46.013; 241/46.014; 241/65; 241/152.2; 241/260.1
[58] Field of Search .................. 241/101 B, 152 A, 65, 241/260.1, 46 B, 100.5

[56] References Cited

U.S. PATENT DOCUMENTS 3,565,350  2/1971  Combs et al. .................... 241/152 A
4,683,814  8/1987  Plovanich et al. ..................... 100/37

FOREIGN PATENT DOCUMENTS

1-083588  3/1989  Japan ..................................... 241/65
1-10002   4/1990  Japan .................................. 241/100.5

Primary Examiner—Mark Rosenbaum
Assistant Examiner—John M. Husar
Attorney, Agent, or Firm—Jones, Tullar & Cooper

[57] ABSTRACT

Wet refuse together with some amount of water may be deposited through a drain port of a sink tub in a common household. The wet refuse is then comminuted into finely divided pieces in a fully automatic manner by a wet refuse crusher without the need for any manual operation, and charged, together with water, into a wet refuse disposer containing a bed or matrix of particulate material loaded with microorganism such as soil bacteria capable of decomposing organics where all of the wet refuse is decomposed and consumed in at most about half a day as the finely divided pieces of wet refuse have tens or hundreds of times as great surface area as the wet refuse in its original form. The water entrained with the wet refuse is passed and discharged through the particulate bed material having a filtering function.

25 Claims, 5 Drawing Sheets

WET REFUSE DISPOSER APPARATUS

TECHNICAL FIELD

This invention relates generally to a wet refuse disposer apparatus for decomposing and consuming wet refuse such as rubbish of cooked food discharged from common households, restaurants and the like, and leavings of processed food discharged from food processing and feed stuff industries and the like, with a view to preserving the human environments.

BACKGROUND ART

Heretofore, the disposal of wet refuse by municipal corporations and others has commonly been carried out by either incineration or burial-in-soil system. While some municipal corporations rely on natural decomposition by installing top-lidded and bottom open buckets on the soil and charging domestic wet refuse or garbage into the buckets, there is no apparatus for disposal at present whereby wet refuse may be decomposed and consumed as such in its original form while saving of space and energy as well as reducing of the time required for disposal can be accomplished.

It is the incineration system that has been most utilized in the prior art. However, it not only requires enormous initial costs for incineration facilities, combustion gas cleaning facilities, odor removing facilities, and the like as well as high fuel costs, but also has been one of sources of carbon dioxide emission which is in turn a cause of the global "warming-up" phenomenon, the solution of which is hastened from the aspect of preservation of regional as well as global environments.

With regard to the burial-in-soil system, the area in which refuse may be dumped to reclaim land is limited in such narrow land situations as in our country. Further, this country should also be careful about the filling-in of the foreshore as one of countries which have ratified the International Treaty for Prevention of Ocean Pollution, since filling-in of the foreshore constitutes one of causes of ocean contamination. It cannot but be said that the burial-in-soil system is a quite unreasonable means especially with respect to the environmental aspect. In addition, the use of wet refuse to reclaim a land would be a source of evil odor and harmful insects, so that since the burial-in-soil system can be accomplished only in remote areas away from residential districts, it is very infeasible from an economic aspect as well, because of the vast transportation and labor costs involved as well as requirements of spacious sites for dumping refuse and then covering the refuse with soil.

The system in which wet refuse is dumped into top lidded and bottom open buckets installed on the soil has the following problems when wet refuse as produced in households is dumped into such buckets everyday:

1. It is involved with very offensive odors; for even with lidded buckets, it is impossible to confine odor molecules produced less than 1 ppm which are sensible to the human nose.

2. Wet refuse as stored in garbage cans such as plastic vessels, the aforesaid top-lidded, open bottomed buckets and the like can be picked out and scattered about by dogs, cats, rats and other small animals.

3. The rate at which the refuse is rotted and decomposed is very slow. There is virtually no consumption of refuse by natural decomposition with the system in which refuse is merely dumped and allowed to be deposited in plastic vessels. Vegetable rubbish, leavings of meals and other cooked remains as produced everyday are thus accumulated to ultimately fill up garbage vessels. Particularly, cellulosic wet refuse such as vegetable rubbish are allowed to dry and be accumulated in an undecomposable state.

4. It may be no problem to carry wet refuse to the garden or field where garbage cans are placed. But, upon opening the lid of the can to dump it, the previously dumped refuse would emit an offensive smell to give one physical and mental pains.

5. Offensive odor from wet refuse would be one of causes of environmental pollution especially in densely populated districts.

The system in which residents are supposed to take wet refuse to predetermined places on days designated by a municipal corporation for collection of wet refuse have also a number of problems as listed below.

a. The residents in the vicinity of a place designated for collection of wet refuse are much annoyed by the bad odor and appearance of the refuse as well as scattering of the refuse by small animals such as dogs, cats and rats.

b. As collection of wet refuse usually takes place twice a week in most municipal corporations, residents are obliged to store wet refuse for a few days in a household. Especially in summer, odor from the wet refuse can, even if it is sealed in a bag, penetrate and disperse out through the bag to be a cause of pollution of the residential environment.

c. In residence such as ferroconcrete apartment houses and high-rise buildings, when carrying wet refuse to a designated place on a day designated for collection, soiled water oozing out of wet refuse can often drip down on the corridors or elevator floors to be a cause of odious smell and contamination.

d. Depending on the next date and time designated for refuse collection, residents may sometimes be forced to change the cooking plan as by avoiding the menu requiring cooking materials difficult to be preserved such as fresh fish or the like.

e. While there is a system in which whenever wet refuse is produced, it is crushed, put into a bag and taken to the designated place on a designated day for collection, there is no essential difference as with respect to emittance of offensive odor.

f. There is yet another system in which wet refuse is frozen for preservation until a day designated for collection. However, it makes no difference in the labor required for carrying the refuse to a designated place for collection, in addition to involving heavy expenses for electric power for continuous operation of the freezer and other maintenances.

g. The time for refuse collection is usually set at the busy hour in the morning twice a week, making residents feel restless.

h. It is bothersome to take refuse outdoors in severe climatic conditions such as the cold winter time and rainy summer season.

i. While some municipal corporations recommend that the use of vinyl bags for wet refuse be avoided as much as possible and that expensive water-proof paper bags be used, residents can be troubled with being short of such bags through carelessness.

SUMMARY OF INVENTION

It is an object of the invention to overcome the aforesaid shortcomings with the prior art and provide an improved apparatus for decomposing and disposing of wet refuse.

Briefly, the present invention provides an apparatus for decomposing and disposing of wet refuse comprising:

A) a wet refuse crusher having a crusher inlet connected to a drain port of a sink tub for receiving wet refuse from the sink tub;

B) a wet refuse disposer comprising a disposer barrel having a side wall, a top wall and a bottom wall for containing a bed of particulate material loaded with microorganism capable of decomposing organics therein; and C) a wet refuse transport pipe connected at its upper end to an outlet of the crusher and at its lower end to a wet refuse inlet of the disposer barrel for introducing the wet refuse from the crusher into the bed of particulate material; said disposer further comprising:
   a. a centershaft mounted in the center of the disposer barrel;
   b. an agitator for agitating said particulate material including an agitating blade secured to an agitator shaft, said agitator being mounted in the barrel between the centershaft and side wall for rotation both on its own axis and around the centershaft;
   c. a first agitator drive mounted to the top plate for rotating the agitator on its own axis;
   d. a second agitator drive mounted to the top plate for rotating the agitator around the centershaft;
   e. a filter screen for filtering decomposition product water resulting from decomposition of the wet refuse, said screen being mounted at a location adjacent the bottom wall of the barrel;
   f. a disposer drain port extending from a sump of decomposition product water underlying the filter screen through the bottom wall;
   g. an air compressor connected through an air conveying pipe and an air supply conduct to the sump of decomposition product water, said air supply conduct having air jets disposed in said sump; and
   h. a vent pipe provided in the top plate and having a removable gas adsobent material fitted thereover.

The operation of the apparatus will be described with reference to disposing of wet refuse in a common household.

Wet refuse together with some amount of water may be deposited through a drain port of a sink tub in a common household. The wet refuse is then comminuted into finely divided pieces in a fully automatic manner by a wet refuse crusher without the need for any manual operation, and charged, together with water, into a wet refuse disposer containing a bed or matrix of particulate material loaded with microorganism such as soil bacteria capable of decomposing organics where all of the wet refuse is decomposed and consumed in at most about half a day as the finely divided pieces of wet refuse have tens or hundreds of times as great surface areas as the wet refuse in its original form. The water entrained with the wet refuse is passed and discharged through the particulate bed material having a filtering function.

The bed material loaded with organics-decomposing microorganism is based on the principle of decomposition and consumption by burial in-soil. The bed material may comprise particles of wood or the like. Organics-decomposing microorganism such as soil bacteria is extracted from the soil and cultivated, and then implanted in the bed material.

The crushed wet refuse charged into the decomposing disposer is agitated uniformly with the bed material loaded with organics-decomposing microorganism such that the upper and lower layers thereof are replaced with each other while it is supplied with air to enhance the activity of the microorganism to thereby effectively carry out the decomposition and consumption of wet refuse in a short time, tens of times as fast as the natural decomposition.

In contrast to the process of simply crushing wet refuse nd discharging it to the sewage system of the municipal corporation, the process according to the present invention discharges the decomposition product water resulting from complete decomposition and consumption of wet refuse. Such decomposition product water possesses not only the ability of decompose organics but also retains nutritive elements and aerobic bacteria, so that it is of high utility value as a liquid organic fertilizer.

BRIEF DESCRIPTION OF THE DRAWINGS

These and other more detailed and specific objects and features of the present invention will be more fully disclosed in the following specification with reference to the accompanying drawings, in which.

DETAILED DESCRIPTION OF THE PREFERRED EMBODIMENTS

Figure 1:
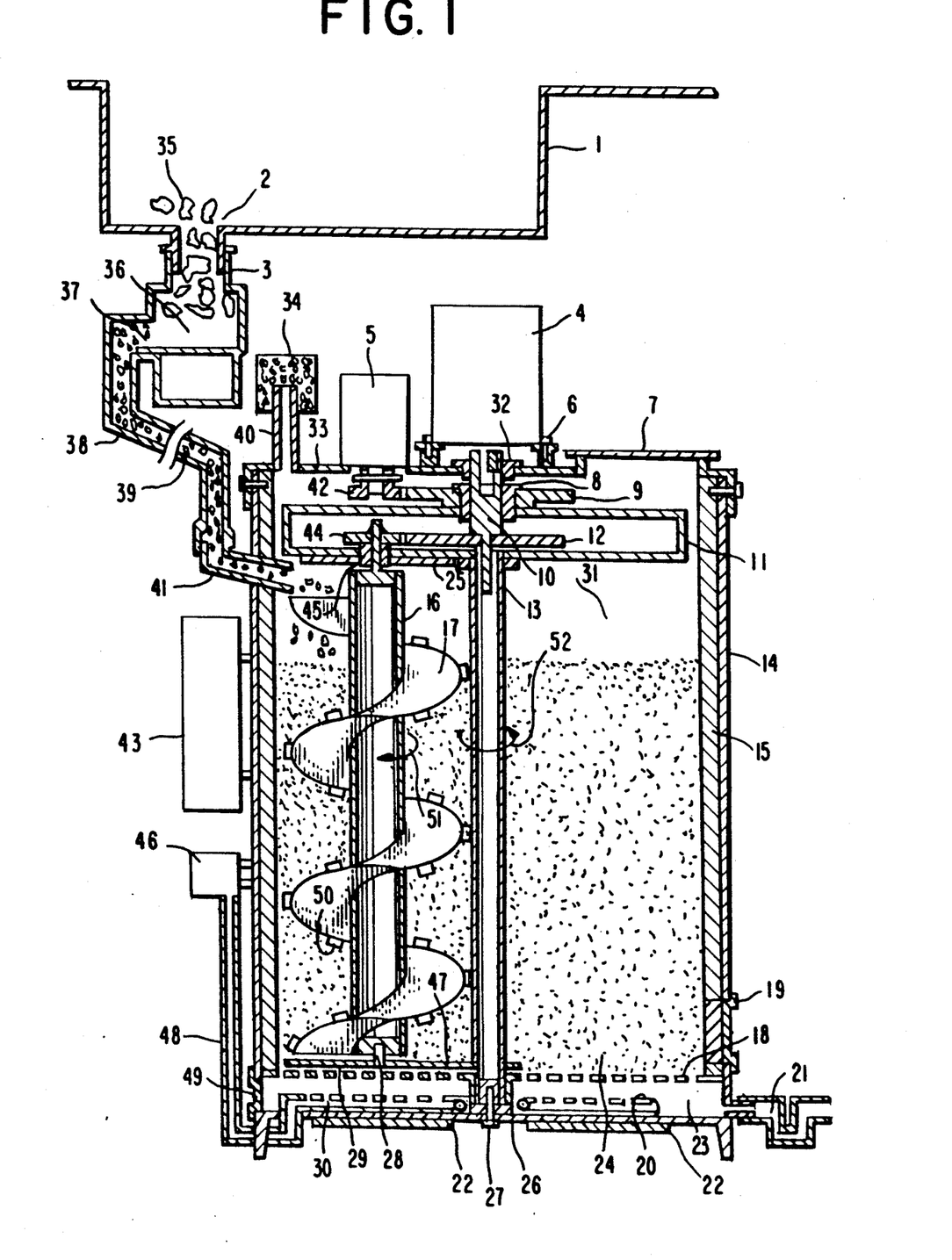
FIG. 1 is a vertical sectional view illustrating the construction of one embodiment of the invention.
Figure 2:
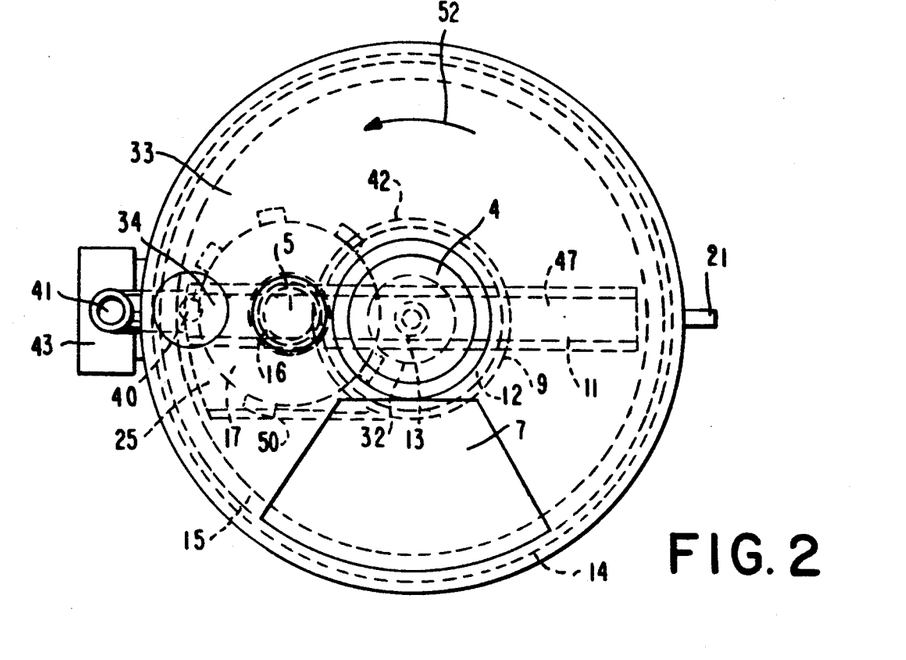
FIG. 2 is a plan view of the principal parts of the apparatus of FIG. 1.

Referring to FIGS. 1 and 2, one embodiment of the wet refuse disposer apparatus according to the present invention is shown.

As shown in FIG. 1, wet refuse 35 in its original form such as rubbish of cooked food, leavings from food processing, remains of meals and the like is discharged as such together with some amount of water through a sink drain port 2 of a sink tub 1. The wet refuse 35 in its original form as discharged through the sink drain port 2 is passed through a crusher inlet 3 communicating with the sink drain port 2 into a wet refuse crusher 36 where it is crushed into minute pieces 39 and then together with a small amount of water added thereto during the crushing, is passed from an outlet 37 of the crusher through a wet refuse transport pipe 38 into a wet refuse disposer barrel 31 via a refuse inlet 41 of the disposer.

The interior of the wet refuse disposer barrel 31 is charged with an appropriate quantity of particulate bed material 24 already implanted with microorganism capable of decomposing organics such as soil bacteria. The crushed wet refuse 39 is deposited with a small amount of water onto the top surface of the bed of particulate material 24. The refuse inlet 41 of the disposer is positioned at the stop position or home position of the agitator comprising an agitator shaft 16 and an agitating blade 17 secured thereto, so that upon the wet refuse crusher 36 being operated, a first agitator drive 4 for rotating the agitator on its own axis is actuated in response to energization of the crusher whereby the agitating blade 17 is rotated to agitate and disperse the crushed wet refuse throughout the bed of particulate material 24. The bed material 24 acts as a filter medium to prevent even the finely divided pieces of refuse from being discharged from a drain port 21 of the disposer while allowing the water to pass therethrough and out through the drain port 21.

The crushed wet refuse 39 as introduced is agitated uniformly and thoroughly in the bed material 24 within the disposer barrel 31 so that all the wet refuse is decomposed and consumed and turned into decomposition product water within at most one day.

The construction and the actuating mechanism of the wet refuse disposer according to the invention will now be described with reference to FIGS. 1 and 2.

When wet refuse 35 in its original form is introduced into the sink drain port 2, initiation of the operation of the refuse crusher 36 may be effected by either manual application of electric power or automatic application of electric power by a sensor for sensing the introduction of wet refuse into the drain port. In either case, the operation of the crusher may be interlocked with the actuation of first and second agitator drives 4 and 5 of the refuse disposer.

Upon the operation of the refuse crusher 36, the wet refuse as charged together with a small amount of water is discharged through the refuse inlet 41 of the disposer onto the upper end of the agitating blade 17 which is at a halt at a predetermined home position, whereupon the refuse is spread and deposited over the top surface of the bed material 24 by the agitating blade 17 which is being rotated by means of a mechanism responsive to the operation of the refuse crusher 36. Said mechanism comprises a studded first drive gear 12 secured to a drive shaft 10 extending from the first agitator drive 4 and a first driven gear 44 in mesh with the drive gear 12 to rotated the agitator shaft 16 on its own axis. However, the agitator shaft 16 will not start revolving around the centershaft 13 until the refuse crusher 36 is stopped. Upon the refuse crusher 36 being stopped, the second agitator drive 5 is actuated to rotate a second drive gear 42 which is in meshing engagement with a second driven gear 9 secured to a gear-accommodating frame 11 to thereby rotate the agitator shaft 16 around the centershaft 13 within the cylindrical refuse disposer barrel 31 along its periphery to agitate the bed material 24 together with the crushed wet refuse.

It has been found that the agitator shaft 16 of the refuse disposer is required to revolve on its own axis as well as around the centershaft for only three minutes even if refuse is charged into the disposer three times a day, for in the case of a small-size domestic disposer which is charged with wet refuse weighing 1 Kg every day, the decomposition is completely accomplished about one minute after wet refuse has been charged. In this example the disposer barrel 31 has a diameter of 35 cm and a height of 40 cm up to the top plate 33, so that it is small enough to be installed underneath the sink tub 1.

What has been found through basic studies is that in the process of decomposing wet refuse by burying it in a soil, if wet refuse is buried in the ground excavated 1 m deep, the rate at which the refuse is decomposed is very slow. In pursuit of the reason for that, it has been found that the decomposing soil bacteria best suited for decomposition of organics are aerobic ones. It is contemplated, therefore, that decomposing bacteria for use in the bed material 24 according to the present invention are aerobic bacteria. It has been found that the effect is greatly enhanced by exposing the upper and lower layers of the bed material 24 carrying organics-decomposing microorganism to fresh air periodically. Such exposure has heretofore been impossible unless a large-sized tub having a wide floor area requiring a broad floor space were used. However, it has been discovered that the decomposition and consumption of wet refuse can be accomplished in a short time by an extremely small agitator/disposer if the contents are subjected to agitation in a rolling-over (from top to bottom and vice versa) manner in a vertically oriented agitator/disposer requiring an extremely small floor space while the agitator/disposer is filled to the corners with fresh air fed from a compressor 46.

The opening of the agitator/disposer is hermetically sealed by a seal plate 32. A very small amount of air from the compressor 46 is forced via an air conveying pipe 48 into an air supply conduit 20 and is jetted through air orifices or jets 30 into a sump 23 of decomposition product water and then passed through a filter screen 18 for decomposition product water into the disposer barrel 31.

In this case, air leakage is prevented by the use of the disposer drain port 21 and the wet refuse transport pipe 38 in the form of a U-shaped tube, and any extremely small quantities of decomposition product gases which may be produced during the process of refuse decomposition is removed by a gas absorbent material 34 fitted over a vent tube 40.

Decomposition product water resulting from common wet refuse, not to mention summertime juicy foods, fruits and the like settles down by gravity through the interstices in the particulate bed material 24 and through the meshes of the filter screen 18 for collection in the decomposition product water sump 23 and then discharged out through the disposer drain port 21. It has been found that the decomposition product water itself has the ability of decomposing organics, and hence the ability of cleaning the sewage system in the associated building site access port 49, which includes a cover to seal against leakage, is provided in the lower part of side wall 14 to allow the sump 23 to be cleaned of decomposition product water.

The side wall 14 of the disposer is lined with an insulating material 15 to eliminate influences by the outside temperature, in consideration of the great differences between extremities of temperature according to the seasons from northern Hokkaido to southern Okinawa in this country.

In view of the case where the disposer is used in severely cold climate districts in winter, heating plates 22 may be affixed to the bottom wall 26 of the disposer to heat the sump 23 of decomposition product water to thereby prevent the decomposition product water in the sump 23 from freezing while at the same time heating the air introduced through the air supply conduit 20 to supply the warm air into the disposer barrel 31 in order to sustain the decomposition process of refuse. The heating plates 22 may be replaced by a hot air blower 54.

Particulate bed material 24 loaded with organics-decomposing microorganism may be charged through a disposer inlet 7 into the disposer barrel 31 and used bed material may be removed through a bed material removal port 19. In this regard, with the bed material removal port 19 open, the bed material may be automatically forced out and discharged by the revolution of the agitating blade 17 on its own axis as well as around the centershaft 13.

When the crusher 36 is either out of order or not in use, wet refuse 35 in its original form is charged into the disposer barrel 31 through the disposer inlet 7. In this connection, the agitating blade 17 may be provided with shredding edges 50 to mechanically divide the refuse as finely as possible to thereby increase the surface areas of the refuse and hence shorten the decomposing time.

When the bed material 24 is in the form of powdered, granular or particulate solids, the direction of rotation of the agitator shaft 16 and blade 17 is, as indicated by an arrow 51 in FIG. 1, such that the bed material is moved from bottom to top.

When a large quantity of wet refuse is to be charged into the disposer at a time, a gear protector plate 25 may preferably be provided on the underside of the gear-accommodating frame 11 in order to prevent the wet refuse itself or the bed material 24 from getting entangled in the first driven gear 44 and drive gear 12. When an aqueous solution having organics-decomposing microorganism dispersed therein is used in place of the particulate bed material 24 loaded with organics-decomposing microorganism, a water-sealing plug should be provided in the disposer drain port 21, although there is no limitation to the direction of rotation of the agitating blade 17 on its own axis and around the centershaft.

Figure 3:
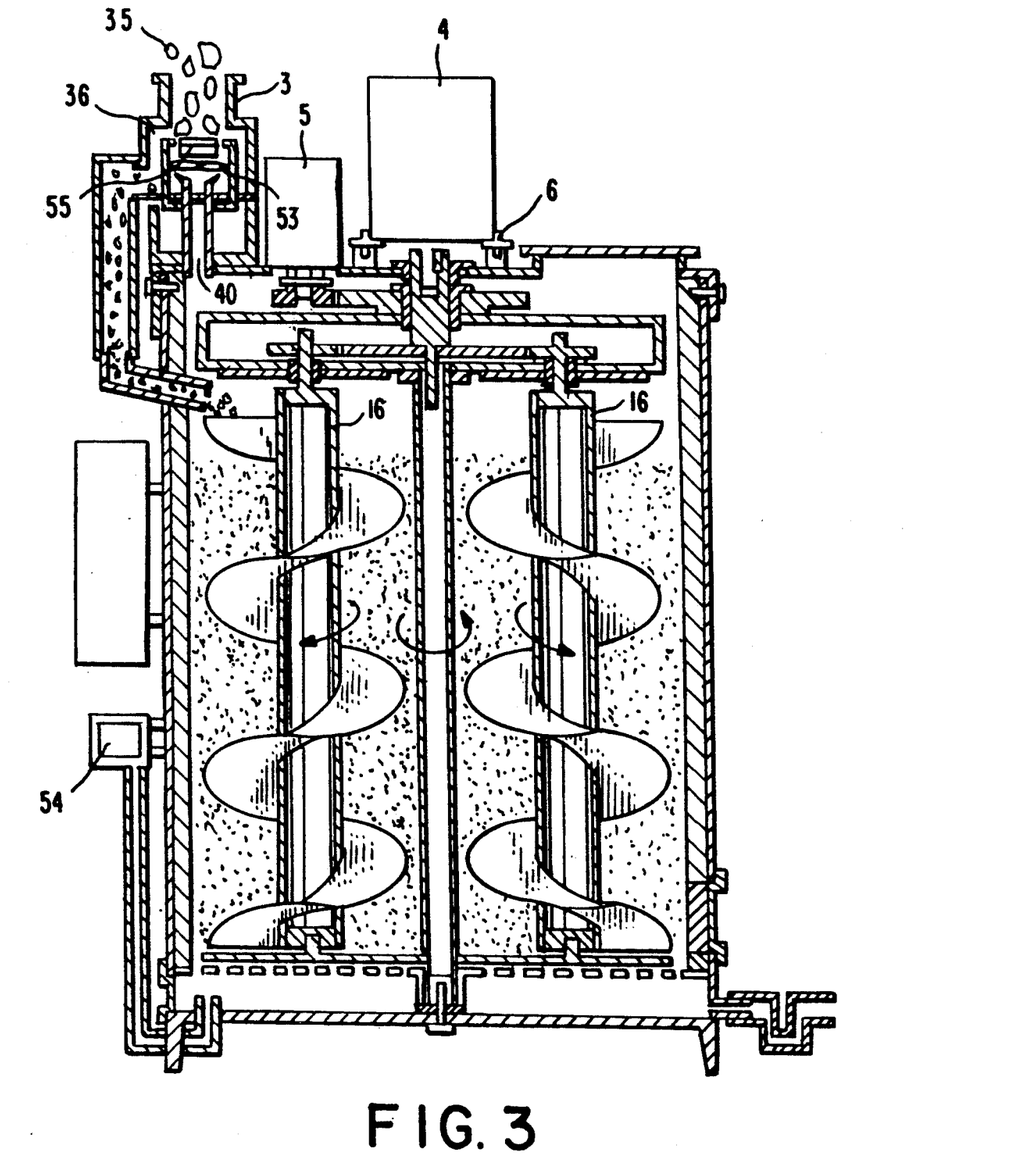
FIG. 3 is a vertical sectional view illustrating the construction of another embodiment of the invention.
Figure 4:
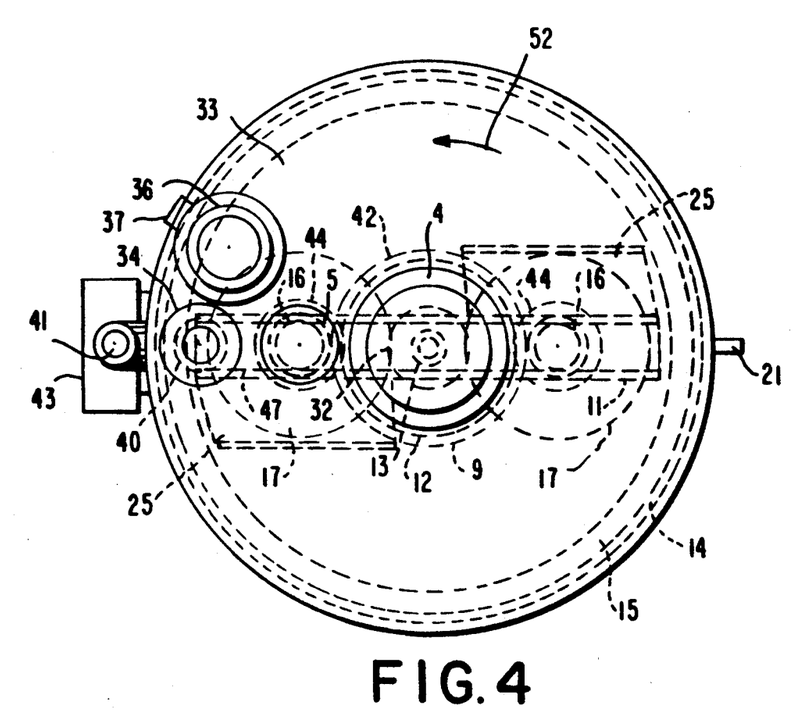
FIG. 4 is a plan view of the principal parts of the apparatus of FIG. 3.
Figure 5:
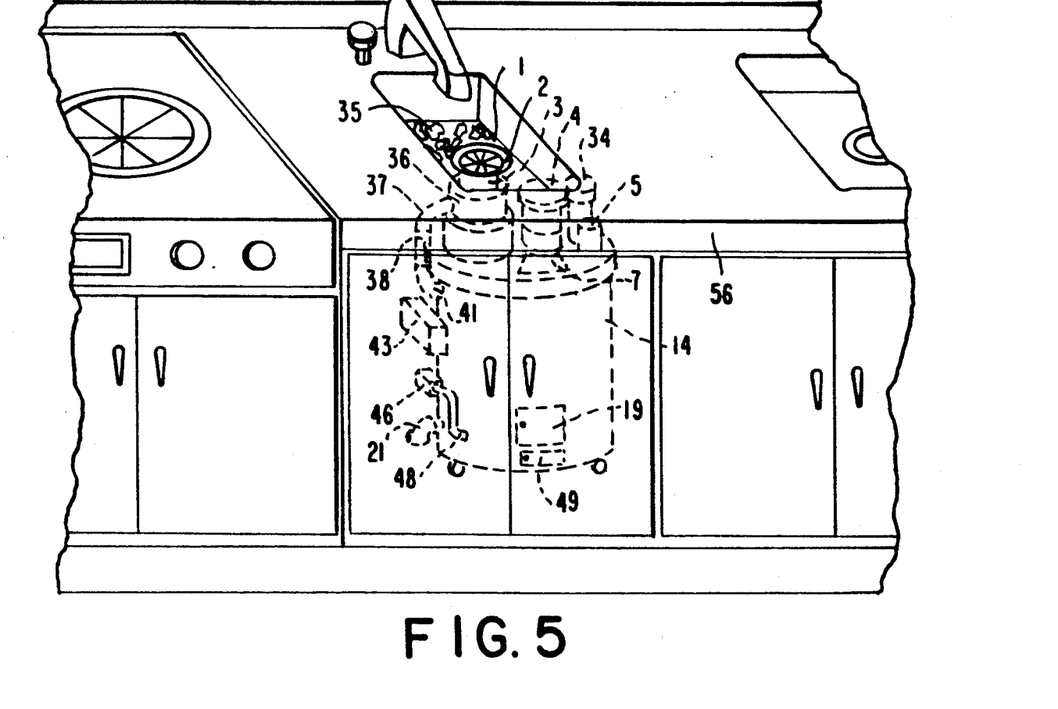
FIG. 5 is a pictorial view illustrating an example of the apparatus installed in place.
Figure 6:
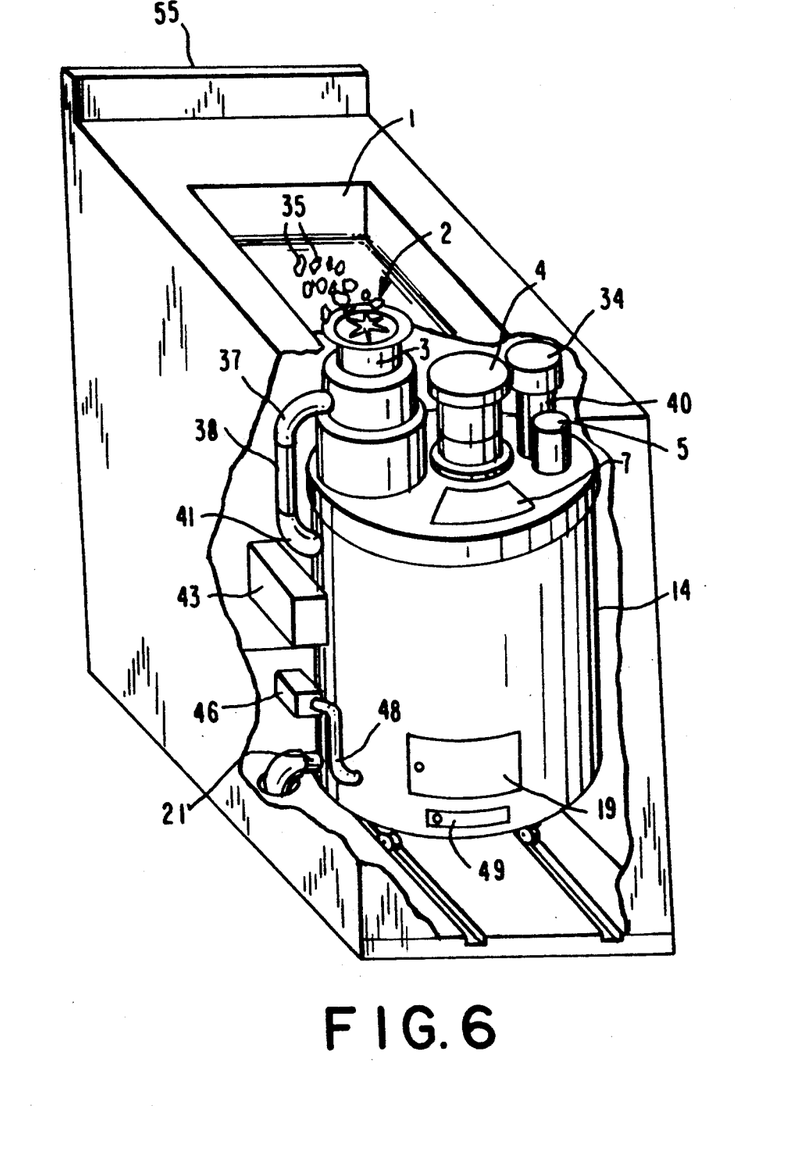
FIG. 6 is a pictorial view illustrating another example of the apparatus installed in place.
Figure 7:
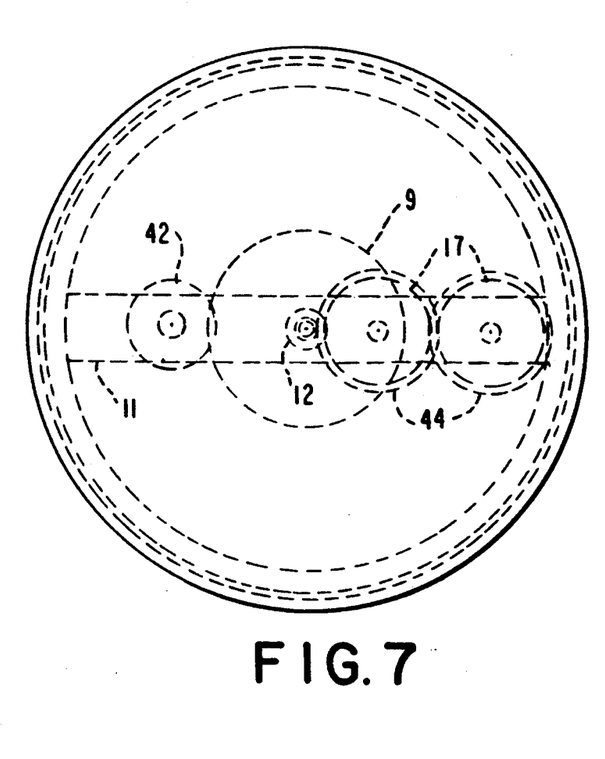
FIG. 7 is a plan view of the disposer body having two agitating blades disposed on a radial line.

When an aqueous solution is used, the best results have been obtained at the solution temperature of 38° C. With a commercial large-sized wet refuse disposer, it can take a prolonged time for the agitating blade 17 to revolve around the centershaft 13 for the agitation with a full loading due to the elongated perimeter of the barrel 31, apart from the rotational motion of the agitating blade 17 on its axis. In view of this, twin agitating blades 17 may be disposed to reduce the time required for agitation of one batch of wet refuse, as shown in FIGS. 3 and 4.

The time required for decomposition and consumption of wet refuse by kinds to be treated by the disposer constructed as described hereinabove is indicated in the following table:

In this table, comparison is also made between wet refuse in its original form without the use of the refuse crusher 36 and wet refuse as crushed by the use of the refuse crusher 36.

Time required for decomposition and consumption of wet refuse by kinds

| Kinds | | Hours 6 12 18 24 | Days 2 3 4 5 6 |
|---|---|---|---|
| Fish flesh (raw) | Org. | ———————————————— (to ~22h) | |
| | Crsh. | ▨▨ (to ~6h) | |
| Beef (cooked) | Org. | ———————————————— (to ~24h) | — (to day 2) |
| | Crsh. | ▨▨▨ (to ~10h) | |
| Chicken (fried) | Org. | ———————————————— (to ~22h) | |
| | Crsh. | ▨▨ (to ~8h) | |
| Heads of mackerel (raw) | Org. | ———————————————— (to ~22h) | |
| | Crsh. | ▨▨▨▨ (to ~14h) | |
| Heads of salted salmon (raw) | Org. | ———————————————————————— | ———— (to day 5) |
| | Crsh. | ▨▨▨▨▨▨ | —— (to day 2.5) |

-continued

Time required for decomposition and consumption of wet refuse by kinds

*Org. means —in its original form—.
*Crsh. means —crushed—.

It will be appreciated from the foregoing descriptions that the present invention provides a novel apparatus which is capable of useful, harmless disposal of wet refuse based on the law of nature by decomposing and consuming wet refuse rapidly through agitation-mixing it with a bed of material loaded with soil bacteria having an organics-decomposing function, to thereby improve the residential environment in the general household, not to speak of improving and preserving the regional and hence global environment.

The above description is included to illustrate the preferred embodiments of the invention and is not meant to limit the scope of the invention. From the above discussion, many variations will be apparent to one skilled in the art that would yet be encompassed by the spirit and the scope of the invention.

What is claimed is:

1. Apparatus for decomposing and disposing of wet refuse comprising:
   A) a wet refuse crusher 36 having a crusher inlet 3 connected to a drain port 2 of a sink tub 1 for receiving wet refuse from the sink tub;
   B) a wet refuse disposer comprising a disposer barrel 31 having a side wall 14, a top plate 33 and a bottom wall 26 for containing a bed of material 24 loaded with microorganism capable of decomposing organics therein; and
   C) a wet refuse transport pipe 38 connected at its upper end to an outlet 37 of the crusher and at its lower end to a wet refuse inlet 41 of the disposer barrel for introducing the wet refuse from the crusher into the bed of material 24; said disposer further comprising:
   a. a centershaft 13 mounted in the center of the disposer barrel 31;
   b. an agitator for agitating said bed material including an agitating blade 17 secured to an agitator shaft 16, said agitator being mounted in the barrel between the centershaft and side wall for rotation both on its own axis and around the centershaft;
   c. a first agitator drive 4 mounted to the top plate 33 for rotating the agitator on its own axis;
   d. a second agitator drive 5 mounted to the top plate 33 for rotating the agitator around the centershaft;
   e. a filter screen 18 for filtering decomposition product water resulting from decomposition of the wet refuse, said screen being mounted at a location adjacent the bottom wall 26 of the barrel;
   f. a disposer drain port 21 extending from a sump 23 of decomposition product water underlying the filter screen through the bottom wall;
   g. an air compressor 46 connected through an air conveying pipe 48 and an air supply conduct 20 to the sump 23 of decomposition product water, said air supply conduct 20 having air jets 30 disposed in said sump; and
   h. a vent pipe 40 provided he top plate 33 and having a removable gas absorbent material 34 fitted thereover.

2. Apparatus for decomposing and disposing of wet refuse according to claim 1 including a heating plate means 22 mounted to the underside of the bottom wall 26 of the disposer.

3. Apparatus for decomposing and disposing of wet refuse according to claim 1 in which said side wall 14 is lined with an insulating material 15.

4. Apparatus for decomposing and disposing of wet refuse according to claim 1 including a disposer inlet 7 provided in a the top plate 33 for charging a bed material 24 into the barrel 31.

5. Apparatus for decomposing and disposing of wet refuse according to claim 1 in which said wet crusher 36 and the wet refuse disposer being adapted to be operated in interlocking relation when electric power is applied to a control panel 43.

6. Apparatus for decomposing and disposing of wet refuse according to claim 1 in which a gear-accommodating frame 11 is rotatably mounted in the disposer barrel; said centershaft 13 being fixed at the upper end to the gear-accommodating frame 11 and held at the lower end by a stud 27 upstanding from the bottom wall 26; said first agitator drive 4 has an agitator drive shaft 10 extending therefrom and into said gear-accommodating frame, said drive shaft being rotatably supported in a bearing 8 secured to said gear-accommodating frame 11; said centershaft 13 is fixed at its upper end to the gear-accommodating frame 11 for rotation therewith and rotatably supported at its lower end by a stud 27 upstanding from said bottom wall 26; a first drive gear 12 is secured to said drive shaft 10 for rotation therewith and rotatably supported in said centershaft 13; a radial arm 47 is secured to and extending radially outwardly from the lower end of the centershaft 13 for rotation therewith; said agitator shaft 16 is rotatably supported at its lower end by a stud 28 upstanding from said radial arm 47; the upper end of the agitator shaft 16 is rotatably supported in an agitator bearing 45 secured to the gear-accommodating frame 11; a first driven gear 44 is fixed to the upper end of the agitator shaft 16 in mesh with the first drive gear 12; said second agitator drive 5 has a second drive gear 42 mounted thereto; and a second driven gear 9 in mesh with the second drive gear 42 is secured to said gear-accommodating frame 11 on the center line of the centershaft 13 for rotating said frame with the centershaft to thereby rotate said agitator shaft 16 and blade 17 around the centershaft 13.

7. Apparatus for decomposing and disposing of wet refuse according to claim 1 including a filter screen brush 29 secured to the bottom surface of the lower bearing arm 47 in contact with said filter screen 18 for cleaning the later.

8. Apparatus for decomposing and disposing of wet refuse according to claim 1 including a removal port 19 provided in the lower part of said side wall 14 for removing the bed material 24, and an access port 49 provided in said side wall 14 to provide access to the sump 23 of decomposition product water for cleaning.

9. Apparatus for decomposing and disposing of wet refuse according to claim 6 including a gear protector plate 25 secured to the gear-accommodating frame 11 overlying the agitator shaft 16.

10. Apparatus for decomposing and disposing of wet refuse according to claim 1 in which said bed material 24 comprises particles of wood.

11. Apparatus for decomposing and disposing of wet refuse according to claim 1 in which said bed material 24 comprises porous inorganic powders.

12. Apparatus for decomposing and disposing of wet refuse according to claim 1 in which said bed material 24 comprises porous inorganic particulates.

13. Apparatus for decomposing and disposing of wet refuse according to claim 1 in which said bed material 24 comprises a mixture of particles of wood and porous inorganic powders.

14. Apparatus for decomposing and disposing of wet refuse according to claim 1 in which said bed material 24 comprises a mixture of particles of wood and porous inorganic particulates.

15. Apparatus for decomposing and disposing of wet refuse according to claim 1 in which said bed material 24 comprises shells.

16. Apparatus for decomposing and disposing of wet refuse according to claim 1 in which said bed material 24 comprises shells and particles of wood.

17. Apparatus for decomposing and disposing of wet refuse according to claim 1 in which said bed material 24 comprises an aqueous solution having organics-decomposing-microorganism mixed therein.

18. Apparatus for decomposing and disposing of wet refuse according to claim 1 in which the agitating blade 17 is a helical blade.

19. Apparatus for decomposing and disposing of wet refuse according to claim 1 including two of the agitating blade 17 having its agitator shaft 16.

20. Apparatus for decomposing and disposing of wet refuse according to claim 1 in which two of the agitator shaft 16 having an agitating blade 17 are disposed on a radial line of the disposer barrel 31.

21. Apparatus for decomposing and disposing of wet refuse according to claim 1 in which the wet refuse crusher 36 is mounted on the disposer barrel 31.

22. Apparatus for decomposing and disposing of wet refuse according to claim 1 including an electric forced suction fan 53 disposed in the vent pipe.

23. Apparatus for decomposing and disposing of wet refuse according to claim 1 including a hot air blower 56 connected to one end of the air conveying pipe 48.

24. Apparatus for decomposing and disposing of wet refuse according to claim 1 in which said apparatus is incorporated in a system kitchen sink 56.

25. Apparatus for decomposing and disposing of wet refuse according to claim 1 in which said apparatus is incorporated in a single-tub sink 55 having a sink tub 1.

* * * * *

UNITED STATES PATENT AND TRADEMARK OFFICE
CERTIFICATE OF CORRECTION

PATENT NO. : 5,123,600
DATED : June 23, 1992
INVENTOR(S) : Takenaka

It is certified that error appears in the above-identified patent and that said Letters Patent is hereby corrected as shown below:

Claim 1, column 12, line 40, "he" should be --in the--,

Signed and Sealed this

Twenty-fourth Day of August, 1993

Attest:

BRUCE LEHMAN

Attesting Officer   Commissioner of Patents and Trademarks